United States Patent [19]

Kawakubo et al.

[11] Patent Number: 4,882,102
[45] Date of Patent: Nov. 21, 1989

[54] PROCESS FOR PRODUCING HARD CARBONACEOUS SHEETS

[75] Inventors: Takamasa Kawakubo, Gunma; Mitsuru Yoshida, Fujioka; Yoshihisa Suda, Maebashi, all of Japan

[73] Assignee: Mitsubishi Pencil Co., Ltd., Tokyo, Japan

[21] Appl. No.: 115,375

[22] Filed: Nov. 2, 1987

[51] Int. Cl.$^4$ .................. B05D 31/02; C01B 31.02
[52] U.S. Cl. .................. 264/29.3; 264/29.6; 423/449; 427/228
[58] Field of Search .................. 264/29.3, 29.6, 85; 423/449; 427/228

[56] References Cited

U.S. PATENT DOCUMENTS

| | | | |
|---|---|---|---|
| 3,355,527 | 11/1967 | Muta et al. | 423/449 |
| 3,592,883 | 7/1971 | Kawakubo | 264/29.6 X |
| 4,213,956 | 7/1980 | Ubbelohde | 423/449 X |
| 4,360,485 | 11/1982 | Emanuelson et al. | 423/449 X |
| 4,582,632 | 4/1986 | Rokujo et al. | 264/29.6 X |

FOREIGN PATENT DOCUMENTS

| | | | |
|---|---|---|---|
| 58-145608 | 8/1983 | Japan | 423/449 |
| 59-195515 | 11/1984 | Japan | 423/449 |
| 60-155570 | 8/1985 | Japan | 423/449 |
| 60-231470 | 11/1985 | Japan | 423/449 |

Primary Examiner—Jeffery Thurlow
Assistant Examiner—Leo B. Tentoni
Attorney, Agent, or Firm—Oliff & Berridge

[57] ABSTRACT

An improved process for producing hard carbonaceous sheets, which comprises uniformly dispersing as a viscous binder in fine carbon powder a mixture of relatively readily polymerizable thermosetting resins such as monomers, prepolymers or low polymers exhibiting high residual carbon yield after calcining; applying mechanical energy to the resultant mixture to induce mechanochemical phenomenon to produce molding paste composition in which said binder is uniformly rigidly bonded physicochemically to the surfaces of the primary particles of the fine powder, molding the composition by a fluid rolling method or a coating method in a film or sheet shape; infusibilizing the resultant molding; and calcining the resultant molding in an inert gas atmosphere. Thus, the hard carbonaceous sheets thus produced have small porosity, high mechanical strength, high elastic modulus, isotropy and uniform thickness of several microns to several mm using widely available and inexpensive manufacturing processes.

3 Claims, No Drawings

PROCESS FOR PRODUCING HARD CARBONACEOUS SHEETS

BACKGROUND OF THE INVENTION

The present invention relates to a process for producing hard carbonaceous sheets and, more particularly, to a process for readily producing hard carbonaceous sheets having small porosity, high mechanical strength, high elastic modulus, high hardness, isotropy and uniform thickness of several ten microns to several millimeters.

Such carbonaceous sheets can be applied to packings, gaskets, or can reduce the weight of an electrode or a shielding sheet for a chemical plant. These carbon sheets have been trially produced by a variety of processes, but thin carbon sheets which satisfy the above-described conditions cannot yet be obtained. For instance, non-impregnation graphite is produced by ordinarily impregnating a carbon material with a phenol resin or furan resin and then curing the impregnated carbon material, or by impregnating, curing and then recalcining, or repeatedly impregnating, curing and then calcining. However, the porosity of the carbon material thus produced is small ($K = 10^{-3}$ cm$^2$/s), has mechanical strength twice as that of a base material with excellent corrosion resistance, but the manufacturing processes are not only complicated, but only thick products can be fabricated. The reduction in the weight of the product is almost impossible. More specifically, the carbon material is ordinarily produced in a block shape. When thin sheets are produced, the carbon material of this block shape should be cut. However, it was extremely difficult to cut the carbon material of the block shape into thin sheets having a thickness of 1 mm or less, and the carbon material can be cut into thin sheets having at least several mm at the thinnest. Even if the carbon material of the block shape can be cut, it is difficult to cut the material into thin sheets after impregnation of resin so as not to cause cracks or crazes. Even if the carbon material is cut into thin sheets without impregnation, the hardness of the carbon material is remarkably increased. As a result, an expensive cutter should be employed. In addition, a cutting technique of high precision is necessary, with the result that, even if such thin sheets can be produced, its cost extremely increases. An example of succeeding the reduction in the thickness of the carbon product is a sheet-like flexible graphite. Such sheet-like graphite was produced by acid treating natural graphite, heating the graphite to expand the graphite, and the graphite is then rolled and shaped into sheets having a thickness of several microns. In addition, its porosity is small to 2 x 10$^4$ cm/s. However, such sheets have bending strength nearly equal to zero, and cannot accordingly be applied to a product, to which bending stress is applied. Since a large quantity of strong acid is used in the manufacturing processes, corrosion resistance and drainage of the apparatus for performing the process must be sufficiently paid, thereby causing high cost. On the other hand, the carbon material has non gas permeability in the same degree as glass ($K = 10^{-10}$ to $10^{-12}$ cm$^2$/s), extremely high mechanical strength, isotropy and extremely small surface area as vitreous carbon. This vitreous carbon is obtained by employing as base material thermosetting synthetic resin such as furan resin, phenol resin, adding a suitable hardening agent, hardening the resultant mixture at room temperature or slightly higher than room temperature for a long period of time such as 1 to 6 weeks, and calcining the carbon at a slow temperature rising velocity so as to prevent cracks due to the projection of volatile contents produced by thermal decomposition. In this manner, the structure of the conventional vitreous carbon not only requires calcining for a long period of time but it is difficult to obtain thin sheets from the observation of the manufacturing processes. In addition, the vitreous carbon has extremely high hardness, and the vitreous carbon of the block shape cannot be cut into thin sheets more difficult than the case of non-impregnated graphite.

SUMMARY OF THE INVENTION

Accordingly, an object of the present invention is to provide an improved process for producing hard carbonaceous sheets having small porosity, high mechanical strength, high elastic modulus, uniform thickness of several microns to several mm using widely available and inexpensive manufacturing processes without secondary treatments nor the above-described drawbacks.

To achieve the foregoing object of the present invention, the inventors have undertook a study to develop a molding composition for obtaining hard carbonaceous sheets having an excellent moldability at room temperature which does not require prior to carbonization any cumbersome pretreatment for maintaining the shape accurately as molded and which can be processed in to moldings having a high density and high mechanical strength without resorting to fabrication or secondary working. The study has revealed that application of high mechanical energy onto a homogeneous dispersion comprising a ground carbonaceous material as an aggregate and a synthetic resin binder which is used for making carbonaceous pencil leads turns the material into a substance which shows properties quite dissimilar from the properties had by the individual components and which can maintain good moldability at room temperatures. Such a substance can be processed into moldings having homogeneous quality and high mechanical strength with a high dimensional accuracy merely by infusibilizing it by oxidization in air and calcining the same, as usual. Based on such findings, the present invention provides a novel process for producing hard carbonaceous sheets which does not essentially require fabrication or secondary working, comprising preparing a homogeneous dispersion of fine carbon powder and a viscous binder which is at least one such substance showing a high residual carbon yield when subjected to calcination to be selected out of the group of those monomers, prepolymers and low polymers which are heat-polymerizable relatively readily, producing a molding paste composition by applying mechanical energy to the resultant dispersion to induce a mechano-chemical reaction therein for causing the binding effect of said binder to extend to the level of the primary particle surfaces of said fine carbon powder evenly and physicochemically strongly, molding the resultant composition by a fluid rolling method or a coating method in a film or sheet state, and infusibilizing and calcining the molded piece in an inert gas atmosphere.

More specifically, in the process according to the present invention at least one such substance showing a high residual carbon yield when subjected to calcination is selected as a viscous binder from the group of those monomers, prepolymers and low polymers which are heat-polymerizable or condensation-polymerizable under heat, and said binder is mixed with an aggregate comprising fine carbon powder of 100 microns or smaller particle mean size such as graphite, carbon black and coke powders. Then high mechanical energy is applied to the binder in the presence of the aggregate, a polymerization catalyst for the binder is added thereto, as required, to obtain a fluid paste composition comprising a fine dispersion in which the binder is bonded to the carbon powder particles physicochemically strongly through a mechanochemical reaction utilizing said mechanical energy, which causes distortion and disturbance of crystal lattices, amorphousization, formation of lattice defects or active centers at particle surfaces, localized high temperature and pressure conditions and/or formation of rest sections having fields of high potential.

According to the present invention as described above, the fluid paste composition is used as the molding composition. Thus, the film or sheet obtained by the molding has accurate thickness, freely selective surfaces of smooth, satin and pattern state, and can be mass produced inexpensively.

While, as monomers, prepolymers or low polymers to produce the thermosetting resin for the molding composition of the present invention, are usable divinylbenzene, methyl vinyl ketone, phenolic resin, furan resin, bismaleimidotriazine resin, diphenyl oxide and epoxy resin, etc. Among those, furan resin, phenolic resin and bismaleimidotriazine resin are more preferable from a viewpoint of handling easiness and moldability.

As fine carbon powder are usable one or more of natural flaky graphite, natural soiled graphite, artificial graphite, rubber carbon black, color carbon black, lamp black and coke powder having 100 microns or less of mean particle size. When the mean particle size exceeds 100 microns, the roughness of skin of the film or sheet at the molding time is large, and mechanical strength after calcining is small to produce non-preferred hard carbonaceous sheets. The ratio of the mixture of the fine carbon powder is selected in a range of 5 to 70% by weight to the mixture composition. When the ratio of mixture is 5% by weight or less, the absolute quantity of fine dispersion particles which are highly physicochemically bound becomes insufficient in the fine carbon powder by the binder due to the mechanochemical phenomenon to produce insufficiently hard carbonaceous sheets. When the ratio of mixture exceeds 70% by weight, the fluidity of the paste composition is insufficient to produce the molding and to also cause sufficient degassing operation not to be carried out unpreferably.

In the process of the present invention, 30 to 95 wt % of monomer, prepolymer or low polymer of thermosetting resin and 70 to 5 wt % of fine carbon powder are first uniformly mixed as required by a blender to produce a paste comprising fine particles in which the binder substance is highly bonded physicochemically by a kneader for producing high shearing force, such as mechanochemical phenomenon by using mixing rolls, Banbury mixer, rotary ball mill. In this case, polymerization catalyst or other viscous binders such as lignin, violanthrene, cracked naphtha pitch and PVC pitch which show high residual carbon yield when subjected to calcination may be added to the binders as required. Further, even if the viscous binder is solid at room temperature or liquid at room temperature, in order to moreover raise the kneadability with the fine carbon powder by increasing the fluidity, heat may be added at the kneading time or a small amount of solvent or plasticizer may be added thereto. The viscosity of the molding paste is preferably, depending upon the molding method, 100 poise or less at 100° C., and more preferably 20 poise or less at 100° C. Since the viscosity may be simply adjusted by the type of the viscous binder, type of polymerization catalyst, type of fine carbon powder, particle size, its mixing ratio, kneading temperature, kneading period, quantity of solvent or plasticizer, the paste of various viscosity may be obtained according to the molding method.

The molding paste composition is molded in a film or sheet shape having a thickness of several tens microns to several mm by a fluid rolling method or a coating method. At this time, in order to accelerate the cure of thermosetting resin after the molding, a polymerization catalyst may be added in advance to the paste composition. In the fluid rolling method, the paste composition is flowed and rolled on a flat plate to form a film or sheet shape. In the coating method, the paste composition is coated on a flat plate by a sprayer, a doctor knife, a reverse roll, or an air knife. In order to uniformly fluid roll or coat the composition, heat may be added to the composition at the coating time so as to reduce the viscosity of the paste composition. The thus fluid rolled or coated composition is allowed to stand at room temperature, or is heated to simultaneously volatilize the solvent and/or plasticizer and cure the thermosetting resin. Then, the composition is introduced into an oven at 50 to 300° C. to perform an infusibilizing, and calcined by gradually heating in an inert atmosphere. The calcining temperature is 800° C. or higher and preferably 1000 to 1500° C.

DESCRIPTION OF THE PREFERRED EMBODIMENTS

The present invention will be more concretely described with respect to the Examples.

EXAMPLE 1

A stock mixture of the following formulation is placed in a Henschel mixture and agitated uniformly to prepare hard carbonaceous sheets:

Furan resin (Hita-furan VF 302 produced by Hitachi Chemical Co. Ltd., Japan) 80 wt %;

Natural flaky graphite (CSP-E produced by Nippon Graphite, Co. Ltd., Japan) 20 wt. %.

Then, the mixed composition was sufficiently kneaded with heated three rolls at 40° C. until the viscous binder resin was uniformly mixed with the graphite by mechanochemical phenomenon. After the kneading, the composition was recovered when the viscous binder resin starts polymerizing so that the entirety slightly increased viscosity. The recovered paste has a viscosity of 20 poise at 25° C.

Then, 0.1 wt % of furan resin curing agent (a curing agent produced by Hitachi Chemical Co., Ltd.) was added to the entire paste, the mixture was then agitated, degassed, and coated on the surface of paper treated with silicon by a reverse roll coater to produce a sheet having 300 mm in width and 0.3 mm in thickness, cured at 70° C. for 5 min. to produce the sheet of the composition. The obtained sheet was cut in length of 300mm, introduced into an oven, gradually heated from room temperature to 180° C. after 6 hours, allowed to stand for 3 hours at the same temperature to infusibilize the composition, then heated at 20° C./hr. of heating speed up to 500° C. and 100° C./hr. up to 1000° C. in nitrogen gas atmosphere to carbonize the composition, and cooled to produce a hard carbonaceous sheet. The produced sheet maintained a size of 0.2 mm in thickness and 255 mm in square accurately with flat surface. The bending strength of the sheet was 30 kg/mm$^2$. The permeability was $8 \times 10^{-11}$ cm$^2$/s.

EXAMPLE 2

The following formulation was placed in a Banbury mixer and kneaded at 100° C. maintained in the mixer for 20 min. to produce the paste comprising carbon particles in which the resin component produced by mechanochemical phenomenon was bonded to the graphite.

Bismaleimidotriazine resin (BT-2100 produced by Mitsubishi Gas Chemical Company, Inc., Japan) 75 wt %, Natural soil graphite, 25 wt %.

The recovered paste had solid state at room temperature, and had a viscosity of 5 poise at 100° C. Then, the paste was fluid rolled on a ground glass plate to become 1mm in thickness in the atmosphere of 100° C. Thereafter, the paste was filled in an oven of 180° C. and allowed to stand for 10 hours to perform the infusibilizing of the composition, cooled, removed and cut into 300 mm in square. The paste was then calcined under the same conditions in the Example 1 in nitrogen gas atmosphere to produce a hard carbonaceous sheet product. The obtained sheet had maintained an accurate size of 0.7 mm in thickness and 240 mm in square. The sheet had the flat surface and the satin surface at opposite side of ground glass having an accurately traced surface. The bending strength of the sheet was 25 kg/mm$^2$. The permeability was $5 \times 10^{-10}$ cm$^2$/s.

EXAMPLE 3

A stock mixture of the following formulation was placed in a rotary ball mill and operated for 3 days and the composition was recovered:

Furan resin (Prominate Q1001 produced by Takeda Chemical Industries, Ltd., Japan) 90 wt %, Carbon black (MA-8 produced by Mitsubishi Chemicals Industries Limited, Japan) 10 wt %.

The viscosity of the composition was 15 poise at 25° C. Then, 0.5 wt % of the curing agent (Prominate Q-2001 produced by Takeda Chemical Industries, Ltd.) was uniformly mixed with the entire paste, the mixture was then deformed, coated by a reverse roll coated on the surface of paper treated with silicon in size of 300 mm in width and 0.1 mm in thickness, maintained in an oven of 60° C. for 5 min. to cure the coated composition in a film shape. Thereafter, the sheet was cut in length of 300 mm, introduced into the oven, heated from room temperature to 180° C. for 6 hours to infusibilize the composition, and calcined under the same conditions in the Example 1 to produce a hard carbonaceous sheet. The produced sheet had maintained an accurate size of 0.07 mm in thickness and 250 mm in square with flat surface. The bending strength of the sheet was 45 kg/mm$^2$. The permeability was $6 \times 10^{-12}$ cm$^2$/s.

What is claimed is:

1. A process for producing hard carbonaceous sheets, comprising:
   uniformly dispersing as a viscous binder in fine carbon powder a relatively readily polymerizable thermosetting resin exhibiting high residual carbon yield after calcining to form a mixture;
   applying mechanical energy to the resultant mixture to induce mechanochemical phenomenon to produce a molding paste composition in which said binder is uniformly rigidly bonded physicochemically to surfaces of the fine powder,
   molding the composition by a coating method into an article having a film or sheet shape;
   infusibilizing the article; and
   calcining the article in an inert gas atmosphere.

2. The process according to claim 1, wherein the viscosity of the molding paste composition is 100 poise or lower at 100° C.

3. The process of claim 1 wherein said thermosetting resin is selected from the group consisting of monomers, prepolymers and low polymers.

* * * * *